United States Patent
Ando

(10) Patent No.: US 11,159,697 B2
(45) Date of Patent: Oct. 26, 2021

(54) CONTROL APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Keiichi Ando, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 27 days.

(21) Appl. No.: 16/596,156

(22) Filed: Oct. 8, 2019

(65) Prior Publication Data

US 2020/0120235 A1 Apr. 16, 2020

(30) Foreign Application Priority Data

Oct. 15, 2018 (JP) .............................. JP2018-194455

(51) Int. Cl.
*G06F 3/12* (2006.01)
*B41J 2/175* (2006.01)
*H04N 1/44* (2006.01)

(52) U.S. Cl.
CPC ........ *H04N 1/4433* (2013.01); *B41J 2/17546* (2013.01); *G06F 3/1219* (2013.01); *G06F 3/1238* (2013.01); *H04N 1/4413* (2013.01)

(58) Field of Classification Search
CPC .... G06F 3/1238; G06F 3/1219; G06F 3/1231; G06F 3/1292; G06F 3/1203; G06F 3/1285; G06F 3/1284; G06F 3/1236; B41J 2/17546
See application file for complete search history.

(56) References Cited

U.S. PATENT DOCUMENTS

| 7,523,224 | B2 * | 4/2009 | Fukunaga | G06F 9/4411 340/12.37 |
| 2016/0292629 | A1 * | 10/2016 | Matsuda | G06F 3/1293 |
| 2017/0339743 | A1 * | 11/2017 | Watanabe | H04W 76/19 |
| 2019/0050175 | A1 * | 2/2019 | Moriya | G06F 3/1231 |

FOREIGN PATENT DOCUMENTS

JP 2003182107 A 7/2003

* cited by examiner

*Primary Examiner* — King Y Poon
*Assistant Examiner* — Michael Burleson
(74) *Attorney, Agent, or Firm* — Carter, DeLuca & Farrell LLP

(57) ABSTRACT

In a case in which a communicating apparatus connected to an information processing apparatus using a first interface supports a predetermined service, and a second interface of the communicating apparatus, which is to be used when the communicating apparatus communicates, for the predetermined service, with another apparatus different from the information processing apparatus, is different from the first interface, a control apparatus sets the second interface of the communicating apparatus to enable communication with the other apparatus.

21 Claims, 8 Drawing Sheets

CONTROL APPARATUS, CONTROL METHOD, AND NON-TRANSITORY COMPUTER-READABLE STORAGE MEDIUM

BACKGROUND OF THE INVENTION

Field of the Invention

The present invention relates to a technique of setting a communication interface for a specific service.

Description of the Related Art

There exists a system that gives a privilege to a user in accordance with an ink cartridge use amount or a cartridge exchange count in an image forming apparatus (printer) (see Japanese Patent Laid-Open No. 2003-182107). In such a system, to allow the user to obtain the privilege, the printer registers the self-apparatus in the system and notifies the system of the information of the ink cartridge use amount or a cartridge exchange count using an interface configured to transmit/receive information to/from the outside of the apparatus.

However, Japanese Patent Laid-Open No. 2003-182107 makes no consideration on a situation in which the information of an image forming apparatus such as a printer cannot be transmitted to the system because communication is impossible. For this reason, if the information of an image forming apparatus such as a printer cannot be transmitted to the system, the user convenience may lower.

SUMMARY OF THE INVENTION

The present invention provides a technique of doing an appropriate communication setting for an apparatus that uses a service with communication.

According to one aspect of the present invention, there is provided a control apparatus comprising: at least one processor; and at least one memory coupled to the at least one processor, wherein the at least one memory stores a computer-readable instruction that causes, when executed by the at least one processor, the control apparatus to: in a case in which a communicating apparatus connected to an information processing apparatus using a first interface supports a predetermined service, and a second interface of the communicating apparatus, which is to be used when the communicating apparatus communicates, for the predetermined service, with another apparatus different from the information processing apparatus, is different from the first interface, set the second interface of the communicating apparatus to enable communication with the other apparatus.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise. In one example, in an apparatus according to the present invention, a function or physical element may be added/changed or removed to/from an apparatus arrangement to be described in the following embodiment. Additionally, in a method according to the present invention, at least some steps may be added, changed, or removed.

System Arrangement

Figure 1:
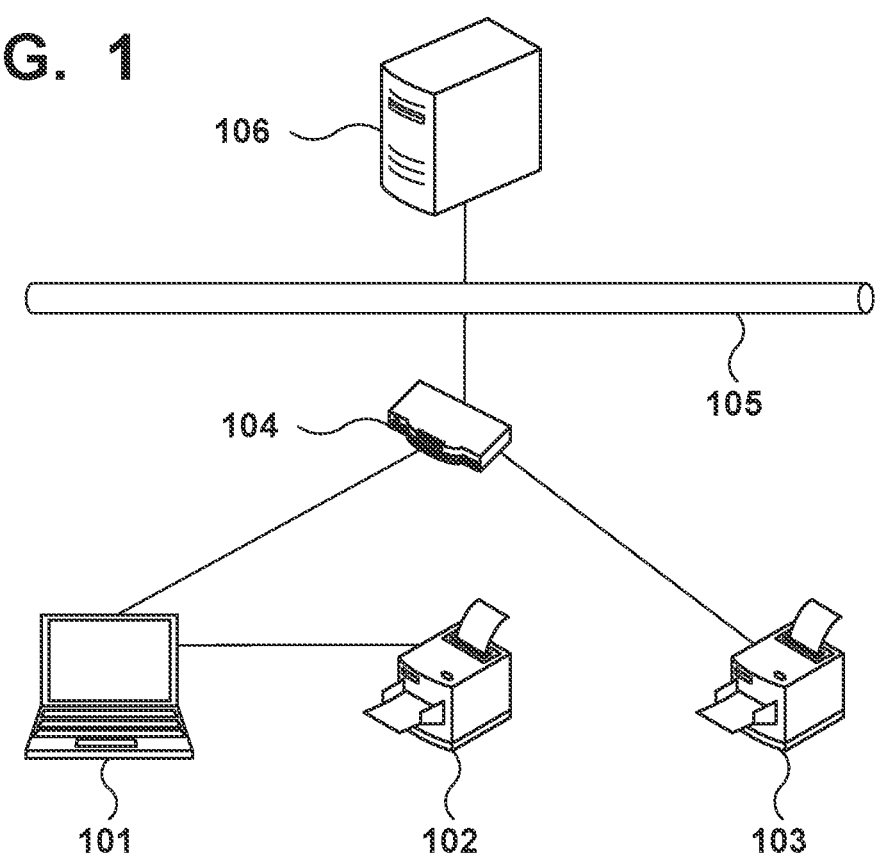
FIG. 1 is a block diagram showing an example of the arrangement of a system.

FIG. 1 shows an example of the arrangement of a system according to this embodiment. In one example, this system is a communication system, and includes a computer 101, a first printer 102, a second printer 103, a router 104, and a management server apparatus 106. The plurality of apparatuses are configured to be communicable with other apparatuses directly or via the router 104 or a network 105. For example, the computer 101 and the first printer 102 are directly connected, and the computer 101 and the second printer 103 are connected via the router 104. Note that in this embodiment, the computer 101 and the first printer 102 are connected by a USB (Universal Serial Bus) cable. In addition, the direct connection between the computer 101 and the first printer 102 corresponds to a situation in which communication can be performed without the intervention of the router (or access point (AP)) 104. Accordingly, the computer 101 and the first printer 102 can directly communicate, and the computer 101 and the second printer 103 can communicate via the router 104. In addition, the computer 101 and the second printer 103 are connected to the network 105 via the router 104, and the management server apparatus 106 is directly connected to the network 105. This allows the computer 101 to communicate with the management server apparatus 106 via the network 105. Note that the first printer 102 is connected to the computer 101 but not to the network 105. Note that the network 105 is the Internet in one example.

Apparatus Arrangement

Figure 2:
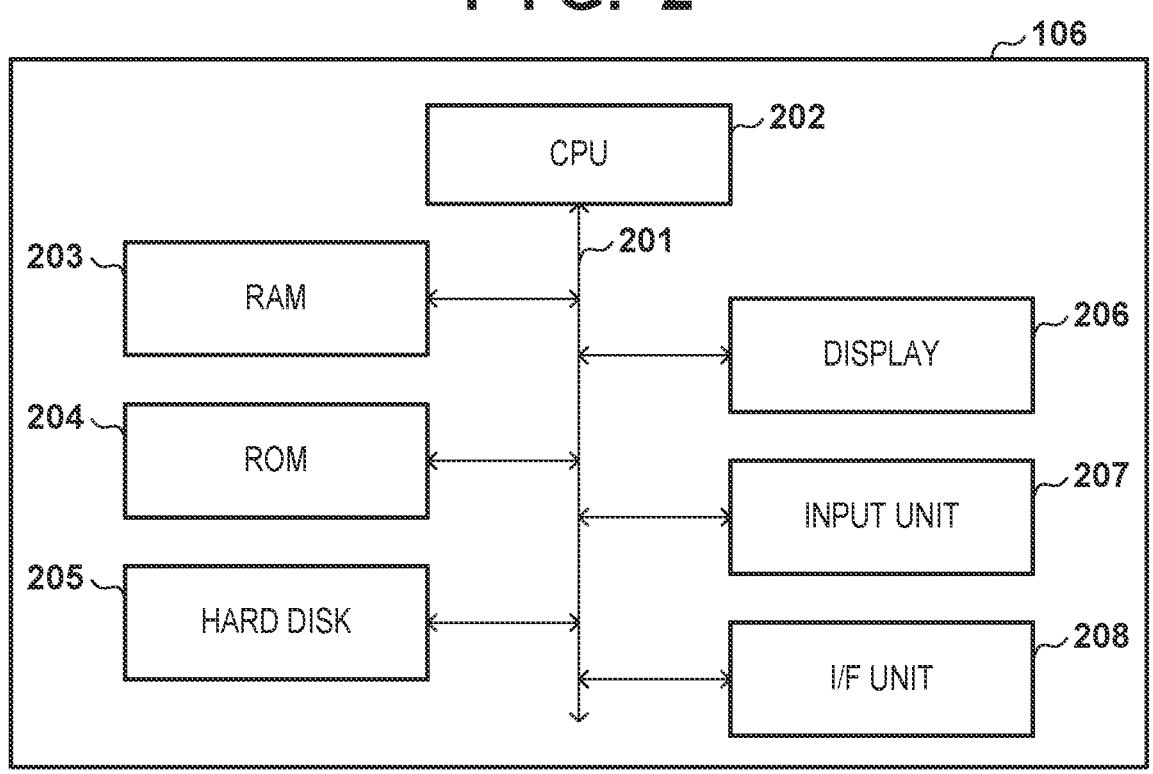
FIG. 2 is a block diagram showing an example of the arrangement of a management server apparatus.
Figure 3:
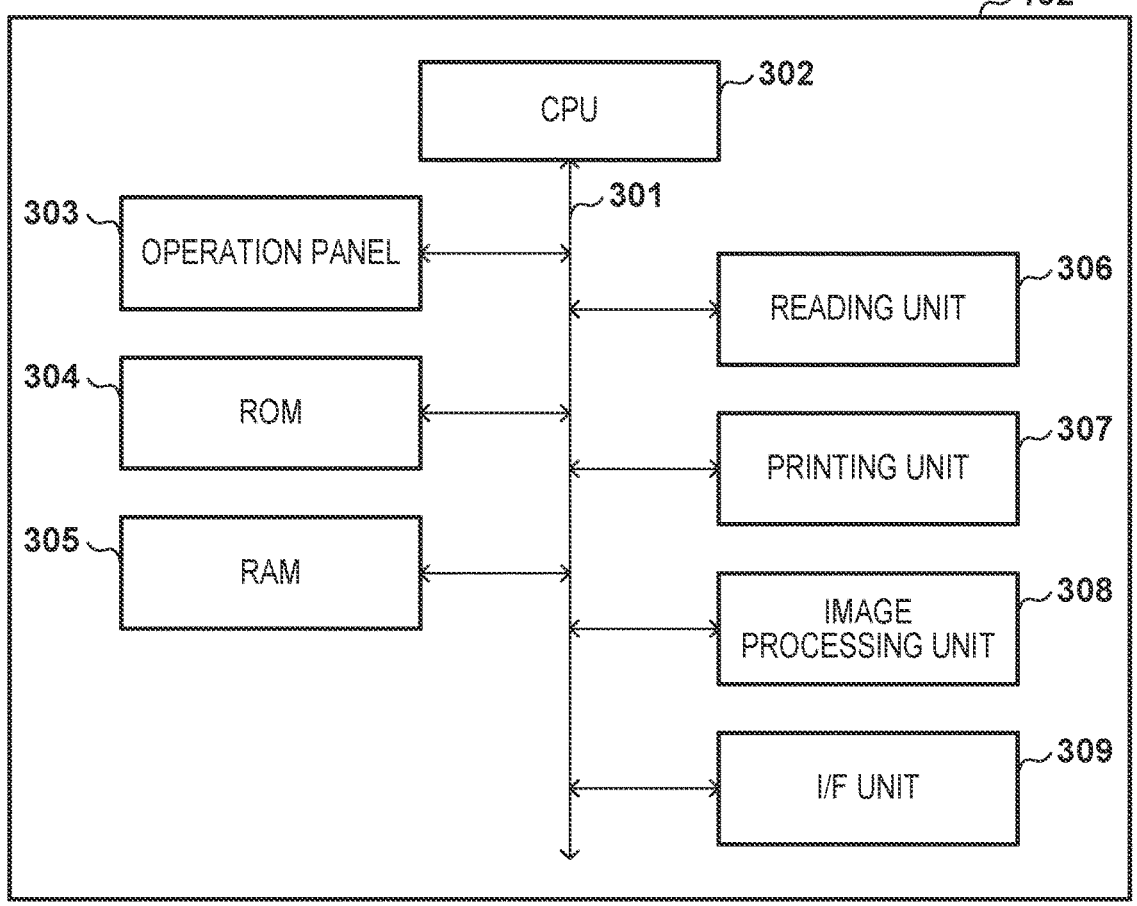
FIG. 3 is a block diagram showing an example of the arrangement of a printer.
Figure 4:
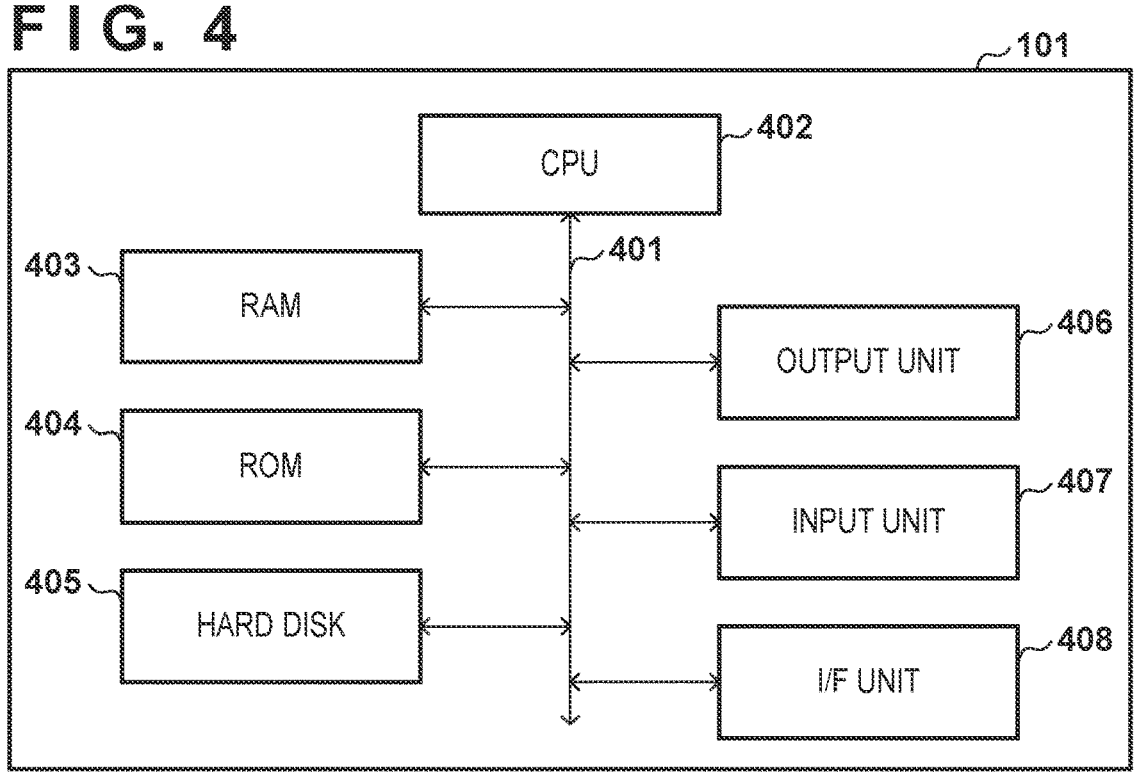
FIG. 4 is a block diagram showing an example of the arrangement of a computer.

Examples of the arrangements of the management server apparatus 106, the first printer 102 and the second printer 103, and the computer 101 described above will be described next with reference to FIGS. 2 to 4. FIG. 2 is a block diagram showing an example of the arrangement of the management server apparatus 106, FIG. 3 is a block diagram showing an example of the arrangement of each of the first printer 102 and the second printer 103, and FIG. 4 is a block diagram showing an example of the arrangement of the computer 101.

In one example, the management server apparatus 106 includes a system bus 201, a CPU 202, a RAM 203, a ROM 204, a hard disk 205, a display 206, an input unit 207, and an interface (I/F unit 208). Here, the CPU 202, the RAM 203, the ROM 204, the hard disk 205, the display 206, the input unit 207, and the I/F unit 208 are configured to be communicable with each other via the system bus 201. Note that CPU is the acronym of Central Processing Unit, RAM is the acronym of Random Access Memory, and ROM is the acronym of Read Only Memory.

The CPU 202 executes an operation of data or an instruction in accordance with software stored in a storage device such as the RAM 203, the ROM 204, or the hard disk 205, and executes various kinds of processing such as determination and control. The RAM 203 is used to temporarily store various kinds of information, or used by the CPU 202 as a temporary storage area when performing various kinds of processing. The ROM 204 holds programs and various kinds of information for activation and control of the management server apparatus 106 or for various kinds of processing to be executed by the management server apparatus 106. The hard disk 205 stores an operating system and the like that should operate in the management server apparatus 106.

The display 206 is a display device configured to display a GUI (Graphical User Interface), the results of various kinds of processing, and the like. The input unit 207 is used to input various kinds of information from the outside to the management server apparatus 106, and includes, for example, a keyboard, a mouse, a touch sensor, a camera, a microphone, and the like. The I/F unit 208 is a communication interface for communication of a wireless LAN, a wired LAN, or the like. The management server apparatus 106 can transmit/receive data to/from a device connected to the network to which the self-apparatus is connected or a device connected to another network via the I/F unit 208 using a protocol such as TCP/IP. Note that FIG. 2 shows an example in which the management server apparatus 106 incorporates the display 206, the input unit 207, and the like. However, this is merely an example, and some functional units such as the display 206 and the input unit 207 may exist outside the management server apparatus 106. In addition, the management server apparatus 106 may be a virtual one such as a service provided by one or more servers on, for example, the Internet. That is, the management server apparatus 106 may not exist physically as long as the functions of the management server apparatus 106 to be described later are provided.

Each of the first printer 102 and the second printer 103 can be a printer having only a printing function, but may be a multi function peripheral having a scan function of reading an original and a facsimile function of transmitting the read original to another apparatus via a network. In this embodiment, a case in which the first printer 102 and the second printer 103 are used will be described. However, electronic devices that have a communication function and perform arbitrary information processing may be used in place of these printers. That is, the first printer 102 and the second printer 103 can be replaced with arbitrary communicating apparatuses. In one example, each of the first printer 102 and the second printer 103 includes a system bus 301, a CPU 302, an operation panel 303, a ROM 304, a RAM 305, a reading unit 306, a printing unit 307, an image processing unit 308, and an I/F unit 309. Here, the CPU 302, the operation panel 303, the ROM 304, the RAM 305, the reading unit 306, the printing unit 307, the image processing unit 308, and the I/F unit 309 are configured to be communicable with each other via the system bus 301. Note that the first printer 102 will be described below. The second printer 103 is similar, and a description thereof will be omitted.

The CPU 302 executes, on the RAM 305, a program stored in the ROM 304 in accordance with, for example, a user operation on the operation panel 303 or a signal such as an instruction received from an external apparatus such as the computer 101, thereby controlling the first printer 102. The operation panel 303 includes, for example, keys, buttons, and a touch pad, which accept an operation input from the user. In some cases, the operation panel 303 can include a display configured to present an image, information for an operation, and control information to the user. The ROM 304 stores a control instruction program and the like of the first printer 102. The RAM 305 is used as a working memory of the CPU 302 or a storage area of the spooler of a print job. The RAM 305 is a nonvolatile memory that stores information held by the first printer 102. For example, when job log information such as a sheet type and size used in a print job is stored in the RAM 305, the job log information is held in the first printer 102 without being erased even in a case in which the power of the first printer 102 is shut down.

The reading unit 306 includes an optical sensor configured to read an original, and generates, on the RAM 305, an image obtained by reading using the optical sensor. The printing unit 307 is a printing apparatus that is provided with an ink tank for storing ink and a printhead configured to discharge the ink, includes a conveyance unit configured to convey a print sheet, and the like, and prints an image on a print medium by an inkjet method. Note that the printing unit 307 may be print an image not by the inkjet method but by, for example, an electrophotographic method. The image processing unit 308 executes various kinds of image processing. The image processing unit 308 performs, for example, image processing for making the printing unit 307 print an original read using the reading unit 306, thereby implementing a copy function. The I/F unit 309 is a communication interface for communication of a wireless LAN, a wired LAN, or the like. The first printer 102 can transmit/receive data to/from a device connected to the network to which the self-apparatus is connected or a device connected to another network via the I/F unit 309 using a protocol such as TCP/IP. A job log stored in the RAM 305 is transmitted to the management server apparatus 106 via the I/F unit 309. The job log may be not stored in the RAM 305 but transmitted to the management server apparatus 106 via the I/F unit 309.

The computer 101 is, for example, an information processing apparatus such as a general-purpose personal computer (PC), a tablet, a smartphone, or a camera. In one example, the computer 101 includes a system bus 401, a CPU 402, a RAM 403, a ROM 404, a hard disk 405, an output unit 406, an input unit 407, and an I/F unit 408. Here, the CPU 402, the RAM 403, the ROM 404, the hard disk 405, the output unit 406, the input unit 407, and the I/F unit 408 are configured to be communicable with each other via the system bus 401.

The CPU 402 executes an operation of data or an instruction in accordance with software stored in a storage device such as the RAM 403, the ROM 404, or the hard disk 405, and executes various kinds of processing such as determination and control. The RAM 403 is used to temporarily store various kinds of information, or used by the CPU 402 as a temporary storage area when performing various kinds of processing. The ROM 404 holds programs and various kinds of information for activation and control of the computer 101 or for various kinds of processing to be executed by the computer 101. The hard disk 405 stores an operating system and the like that should operate in the computer 101. The output unit 406 outputs a screen configured to display a GUI (Graphical User Interface), the results of various kinds of processing, and the like, and a voice. The input unit 407 is used to input various kinds of information from the outside to the computer 101, and includes, for example, a keyboard, a mouse, a touch sensor, a camera, a microphone, and the like. The I/F unit 408 is a communication interface for communication of a wireless LAN, a wired LAN, or the like. The computer 101 can transmit/receive data to/from a device connected to the network to which the self-apparatus is connected or a device connected to another network via the I/F unit 408 using a protocol such as TCP/IP. Note that FIG. 4 shows an example in which the computer 101 incorporates the output unit 406, the input unit 407, and the like. However, this is merely an example, and some functional units such as the output unit 406 and the input unit 407 may exist outside the computer 101.

In this embodiment, the first printer 102 cannot directly communicate with the network 105 in the initial state, and therefore, cannot communicate with the management server apparatus 106. In this state, the first printer 102 cannot notify the management server apparatus 106 of an ink cartridge use amount or a cartridge exchange count. Hence, in this embodiment, for example, the computer 101 executes connection processing for enabling communication by the first printer 102 with the management server apparatus 106. Note that in this embodiment, a service that needs notification of the ink cartridge use amount or the cartridge exchange count from the first printer 102 to the management server apparatus 106 is used. However, such a service need not always be used. That is, in a state in which the first printer 102 is connected to the computer 101, settings are done to enable arbitrary communication between the first printer 102 and the management server apparatus 106 in a case in which a condition to perform predetermined communication with the management server apparatus 106 is satisfied. Note that the arrangement shown in FIG. 1 is merely an example, and each of the computer 101, the first printer 102, and the management server apparatus 106 may be replaced with an arbitrary communicating apparatus having an arbitrary communication interface.

Procedure of Processing

Figure 5:
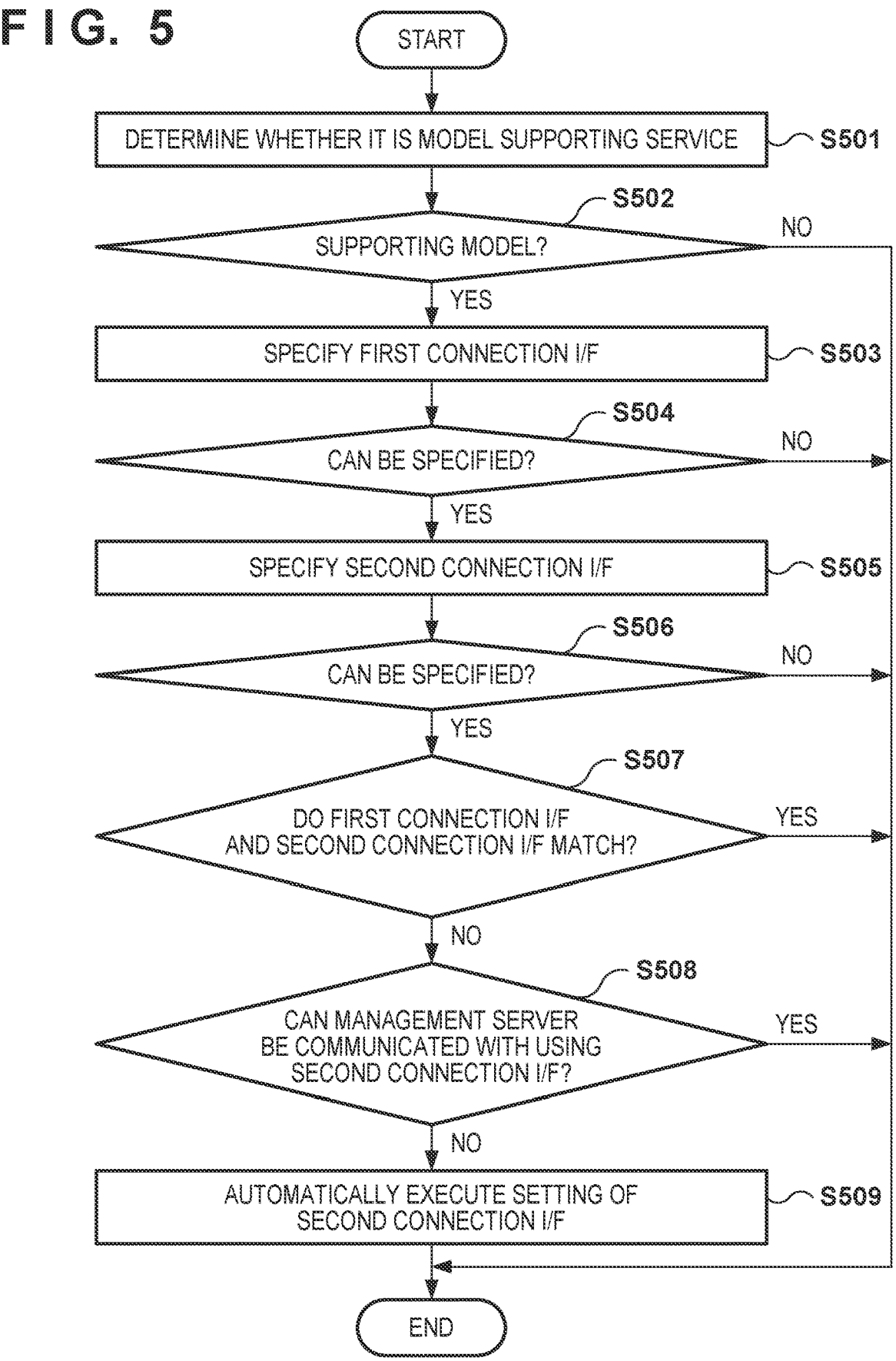
FIG. 5 is a flowchart showing an example of the procedure of setting processing of the printer.

An example of the procedure of processing executed in this embodiment will be described next. FIG. 5 shows an example of the procedure of connection setting processing for enabling communication between the first printer 102 and the management server apparatus 106. This processing is implemented when, for example, the CPU 402 of the computer 101 executes a program stored in the RAM 403, the ROM 404, the hard disk 405, or the like.

In this processing, the computer 101 first inquires of the first printer 102 whether it is a model supporting a target service (step S501). As described above, in this embodiment, the computer 101 and the first printer 102 are locally connected via a USB cable. For this reason, the inquiry in step S502 is made using the local connection by the USB cable or the like. The target service is a service in which, for example, the first printer 102 provides information representing the state of the first printer 102 such as an ink cartridge use amount or a cartridge exchange count to the management server apparatus 106, and a privilege is provided to the user of the first printer 102 based on the information. Note that the state of the first printer 102 is not limited to the ink cartridge use amount and the cartridge exchange count, and can include, for example, various states such as a print count, a cleaning count of an ink head, the state and count of power on/off, and the like. If the first printer 102 is a scanner, the state may include a scan count and the like. Various states to be notified to an external apparatus for the target service may be defined in accordance with the function of the first printer 102. Upon receiving the inquiry, as a response to the inquiry, the first printer 102 transmits, to the computer 101, information representing whether the printer is a model supporting the target service based on internally saved identification information.

Upon specifying, based on the received information, that the first printer 102 supports the target service (YES in step S502), the computer 101 advances the process to step S503. On the other hand, upon specifying that the first printer 102 does not support the target service (NO in step S502), the computer 101 ends the processing. This can prevent the first printer 102 from unnecessarily executing connection setting processing in a case in which it is unnecessary to notify the management server apparatus 106 of the information of the state.

In step S503, the computer 101 specifies a first connection I/F used by the first printer 102 for connection with the computer 101. For example, the computer 101 monitors the connection state of the self-apparatus, and if an I/F that is in a communicable state with the first printer 102 exists, specifies the I/F as the first connection I/F. In this embodiment, a USB is specified as the first connection I/F. Note that if the first connection I/F cannot be specified, for example, in a case in which an I/F that is in a communicable state with the first printer 102 does not exist (NO in step S504), the computer 101 ends the processing. On the other hand, if the first connection I/F can be specified (YES in step S504), the computer 101 advances the process to step S505.

In step S505, the computer 101 specifies a second connection I/F to be used by the first printer 102 to send a state notification to the management server apparatus 106. For example, the computer 101 can obtain the information of the model name of the first printer 102 and the information of a capability such as a usable communication I/F at the time of initial setting and, specify the second connection I/F based on the information. Alternatively, the computer 101 may transmit, to the first printer 102, a signal for inquiring about an I/F to be used for communication with the management server apparatus 106, and specify the second connection I/F based on a response signal. Upon receiving the inquiry signal, the first printer 102 can detect a communicable I/F and transmit a response signal including information representing the detected I/F to the computer 101. Note that the second connection I/F may be, for example, an I/F connectable to the network 105, or may be an I/F directly connectable to the management server apparatus 106. That is, the communication form of the second connection I/F is not limited as long as it is an I/F configured to enable execution of communication with an external apparatus such as the management server apparatus 106 of the communication destination for the target service of step S501. If the second connection I/F cannot be specified, for example, if the first printer 102 is in a power-off state and cannot transmit the response signal (NO in step S506), the computer 101 ends the processing. On the other hand, if the second connection I/F can be specified (YES in step S506), the computer 101 advances the process to step S507.

In step S507, the computer 101 determines whether the first connection I/F specified in step S503 and the second connection I/F specified in step S505 match. If the first connection I/F and the second connection I/F are different (NO in step S507), the computer 101 advances the process to step S508. On the other hand, if the first connection I/F and the second connection I/F match, and both communication I/Fs are I/Fs capable of communicating with the management server apparatus 106 (for example, in a case of a network), the computer 101 determines YES in step S507. In this case, since the first printer 102 can communicate with the management server apparatus 106 using the first connection I/F, the processing is directly ended. On the other hand, if the first connection I/F and the second connection I/F match, but both communication I/Fs are I/Fs incapable of communicating with the management server apparatus 106 (for example, a USB, a WiFi direct, or the like), the computer 101 determines NO in step S507. In step S508, the computer 101 confirms whether the first printer 102 can communicate with the management server apparatus 106 using the second connection I/F specified in step S505. For example, the computer 101 transmits the address of the management server apparatus 106 to the first printer 102 via the first connection I/F, and instructs the first printer 102 to access the management server apparatus 106. Then, the computer 101 obtains the access result, thereby performing the determination of step S508. If the access result represents an access success, the determination of step S508 ends with YES. In this case, since it can be confirmed that the first printer 102 can communicate with the management server apparatus 106 using the second connection I/F specified in step S505, the computer 101 directly ends the processing. On the other hand, if the access result represents an access failure, the determination of step S508 ends with NO. In this case, the computer 101 determines that the first printer 102 cannot communicate with the management server apparatus 106 using the second connection I/F specified in step S505, and advances the process to step S509. Note that, for example, when specifying the second connection I/F in step S505, the process of step S508 may be omitted by inhibiting specifying of an I/F incapable of communicating with the management server apparatus 106. Note that I/Fs incapable of communicating with the management server apparatus 106 include a wired communication I/F without a cable connected, an I/F dedicated to local connection, and an I/F connectable to only a network that cannot set a communication path to the management server apparatus 106.

In step S509, the computer 101 automatically executes the setting of the second connection I/F using the first connection I/F without an intervention of selection of the user or the like. Note that in step S509, information presentation such as display of a screen to inquire whether to execute setting of the second connection I/F may be done for the user, and if a user operation of instructing execution of the setting is received, the setting processing of the second connection I/F may be executed.

Automatic setting processing of the second connection I/F configured to connect the first printer 102 to the management server apparatus 106, which is executed in step S509, will be described next with reference to FIG. 6. Note that an example in which the second connection I/F is a wireless LAN communication I/F will be described below. However, the present invention is not limited to this, and an I/F that operates complying with another arbitrary communication standard may be used. Note that in this case, automatic setting processing of the I/F used to connect to the management server apparatus 106 can be performed as in processing to be described below or using processing defined by the standard of the I/F.

First, the computer 101 inquires of the first printer 102 whether a usable access point (AP) exists on the periphery, and obtains a list of usable APs (step S601). For example, the SSIDs of usable APs are obtained. Note that upon receiving the inquiry signal, the first printer 102 searches for communicable APs and transmits a response signal including information representing the detected AP list to the computer 101. Note that the computer 101 may transmit, for example, an inquiry signal that designates a condition concerning an AP that the first printer 102 should connect, and cause the first printer 102 to search whether an AP that satisfies the condition exists on the periphery of the first printer 102. The condition is, for example, that the SSID includes a predetermined character string or that the AP is connected to the network 105. Note that in this embodiment, the obtaining processing of step S601 is implemented via a USB cable. If an AP list cannot be obtained (NO in step S602), the computer 101 ends the processing. On the other hand, if an AP list can be obtained (YES in step S602), the computer 101 advances the process to step S603.

In step S603, the computer 101 confirms whether the AP currently connected to the self-apparatus is included in the AP list obtained in step S601. If the AP currently connected to the self-apparatus is included in the AP list obtained in step S601 (YES in step S604), the computer 101 advances the process to step S605. On the other hand, if the AP currently connected to the self-apparatus is not included in the AP list obtained in step S601 (NO in step S604), the computer 101 advances the process to step S606. Note that the computer 101 determines that the AP currently connected to the self-apparatus is not included in the AP list if the self-apparatus is not connected to an AP, for example, if the self-apparatus is connected to the network 105 by a wired communication I/F.

In step S605, using the first connection I/F that connects the computer 101 and the first printer 102, the computer 101 transmits the setting profile of the AP currently connected to the self-apparatus to the first printer 102. For example, an SSID, a password, and the like are transmitted. The first printer 102 performs setting of the second connection I/F using the setting profile and is connected to the AP currently connected to the computer 101. In this embodiment, the computer 101 is communicable with the management server apparatus 106. For this reason, when connected to the AP (router 104) currently connected to the computer 101, the first printer 102 becomes communicable with the management server apparatus 106.

In step S506, the computer 101 confirms whether an AP included in the AP list, to which the self-apparatus has ever been connected and whose setting profile is saved, and an AP included in the AP list obtained in step S601 match. Here, the computer 101 can save, for example, a list of APs connectable to the network 105 or APs communicable with the management server apparatus 106. This can prevent, for example, an AP that cannot be connected to the management server apparatus 106 from being included in the AP list obtained in step S601 and thus prevent a setting to connect the first printer 102 to the AP from being done. Note that if an AP whose setting profile information is saved in the self-apparatus is included in the AP list obtained in step S601 (YES in step S607), the computer 101 advances the process to step S605. In this case, the computer 101 transmits the setting profile information of an AP whose setting profile information is saved in the self-apparatus and which is included in the AP list obtained in step S601 to the first printer 102 using the first connection I/F. The first printer 102 performs setting of the second connection I/F using the setting profile information, and is connected to the AP whose setting profile information is saved in the computer 101 and which is included in the AP list obtained in step S601. Accordingly, the first printer 102 can be connected to the AP to which the computer 101 was connected when communicating with, for example, the management server apparatus 106 or the network 105, and the first printer 102 can communicate with the management server apparatus 106. Note that if the AP whose setting profile information is saved in the self-apparatus is not included in the AP list obtained in step S601 (NO in step S607), the computer 101 ends the processing.

With the above-described processing, it is possible to automatically perform communication setting of allowing the first printer 102 that cannot directly communicate with the network 105 and cannot communicate with the management server apparatus 106 either in the initial state to communicate with the management server apparatus 106. For this reason, the first printer 102 can execute communication to receive providing of the target service in step S501.

Figure 6:
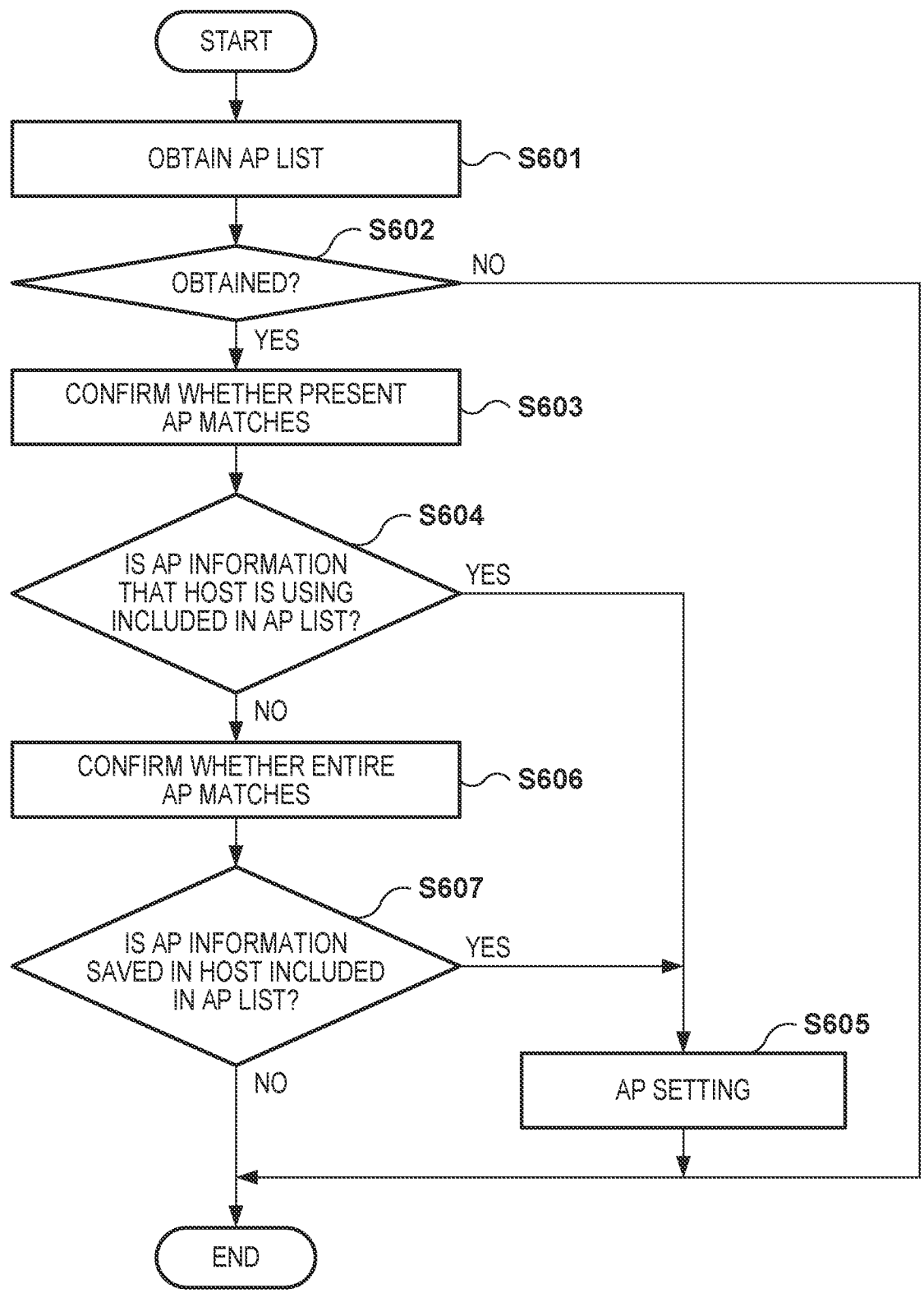
FIG. 6 is a flowchart showing an example of the procedure of automatic setting processing of the printer.

Note that as described above, a case in which the computer 101 is connected to an AP of a wireless LAN has been described concerning the processing example shown in FIG. 6. However, the present invention is not limited to this. For example, in a case in which the computer 101 is connected to one or more connection destinations using an arbitrary communication interface, an arbitrary setting to connect the first printer 102 to the connection destination can be performed. In this case, it is confirmed whether an apparatus of a second connection destination to which the computer 101 is connected is included in apparatuses of a first connection destination connectable by the second connection I/F of the first printer 102. If the apparatus of the second connection destination is included in the apparatuses of the first connection destination, the second connection I/F is set to be connected to the apparatus of the second connection destination. Similarly, if an apparatus whose setting profile is saved by the computer 101 is included in the apparatuses of the first connection destination, the second connection I/F is set to be connected to the apparatus. As described above, the apparatus of the connection destination by the second connection I/F need not be an AP, and a setting for connection to the same connection destination as the computer 101 or the connection destination whose setting profile is saved by the computer 101 can be performed. In addition, the computer 101 may notify the first printer 102 of only the connection destination, and the subsequent setting may independently be executed by the first printer 102. That is, the computer 101 may provide the setting profile to the first printer 102 and lead the setting of the first printer 102, or may instruct only the connection destination to the first printer 102 and leave the subsequent setting to the first printer 102.

In the above-described example, if it is determined in step S604 that the AP connected to the computer 101 is not detected by the first printer 102, it is determined in step S607 whether an AP whose setting profile is stored in the computer 101 is detected. However, the present invention is not limited to this. For example, these determinations may be executed in parallel. Alternatively, the determination of step S607 may be performed before the determination of step S604.

Additionally, in the processing example shown in FIG. 6, if the setting profile of an AP is saved in the computer 101, automatic setting of connecting the first printer 102 to the AP is performed, and otherwise, the automatic setting is not performed. However, the present invention is not limited to this. For example, manual setting of an AP may be performed. An example of the procedure of processing in this case will be described.

Figure 7:
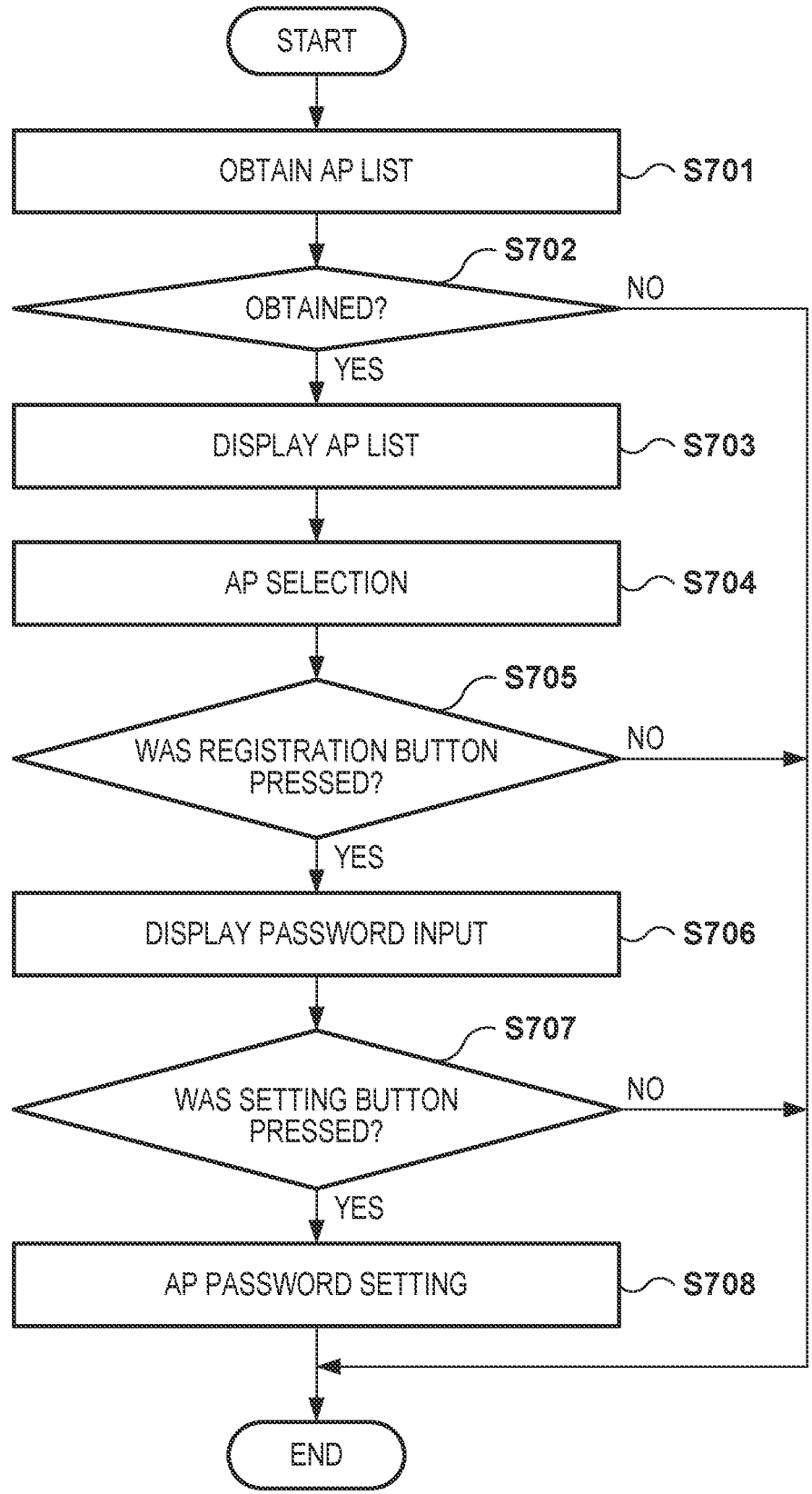
FIG. 7 is a flowchart showing an example of the procedure of manual setting processing of the printer.

FIG. 7 shows an example of the procedure of processing in case in which manual setting of an AP is performed. In this processing, first, the computer 101 inquires of the first printer 102 whether a usable AP exists on the periphery, and obtains a list of usable APs (step S701). If an AP list cannot be obtained (NO in step S702), the computer 101 ends the processing. On the other hand, if an AP list can be obtained (YES in step S702), the computer 101 advances the process to step S703. Note that the processes of steps S701 and S702 are the same as the processes of steps S601 and S602 in FIG. 6.

Figure 8:
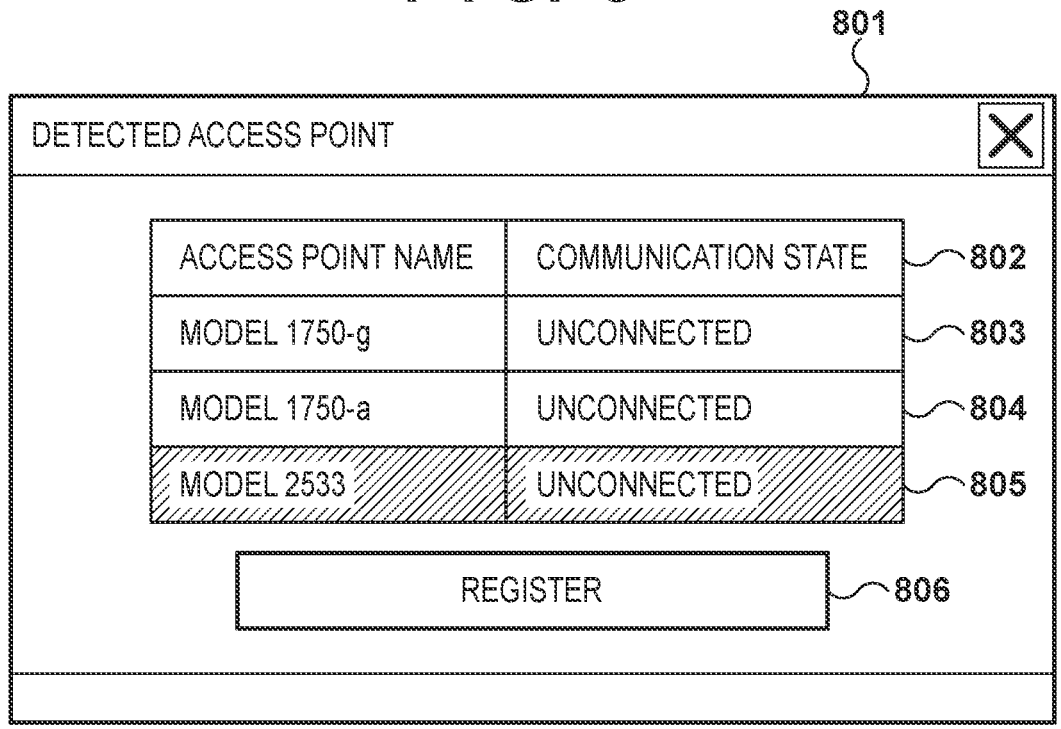
FIG. 8 is a view for schematically explaining a user interface displayed at the time of access point setting.

In step S703, the computer 101 displays the obtained AP list. Note that although the information is visually presented here, the information may be presented to the user by, for example, an arbitrary information presentation function such as a voice or a vibration. FIG. 8 shows an example of a display screen 801 at this time. In the display screen 801 shown in FIG. 8, pieces of information 802 each representing the name of an obtained AP and a connection state to the first printer 102 are listed and displayed, for example, in a predetermined order such as the order of AP detection or the order of AP names. The example of in FIG. 8 shows that an AP 803 whose name is "model 1750-g", an AP 804 whose name is "model 1750-a", and an AP 805 whose name is "model 2533" are detected, and the connection state is "unconnected" in all APs. In this state, the computer 101 is set in an acceptance wait state for selection of an AP by the user from the APs of the list (step S704). Note that FIG. 8 shows a state in which the AP 805 of "model 2533" is selected by the user, and shows an example in which the display is done such that the information concerning the AP 805 has a background color different from that of the remaining APs. According to the acceptance of a user operation representing pressing of a registration button 806 in this state (YES in step S705), the computer 101 advances to AP password setting processing (step S706). On the other hand, if, for example, a predetermined time elapses without detecting the acceptance of the pressing operation of the registration button 806 (NO in step S705), the computer 101 ends the processing.

Figure 9:
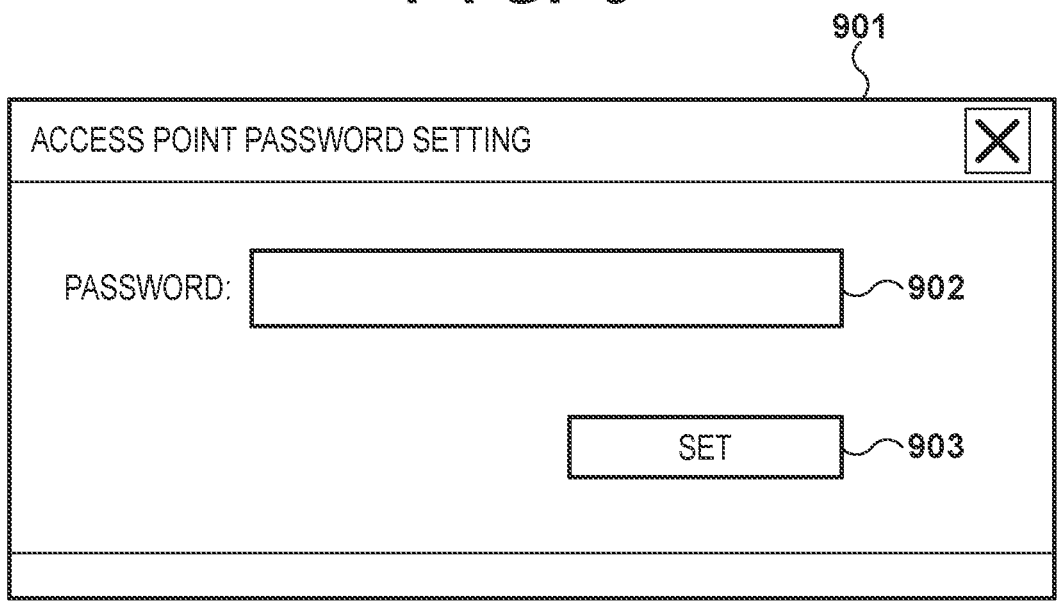
FIG. 9 is a view for schematically explaining a user interface displayed at the time of access point setting.

In the AP password setting processing of step S706, the computer 101 performs control to display a setting screen 901 as shown in FIG. 9, and waits for input of the character string of a password by the user in a password input field 902. After that, upon accepting a user operation of pressing a setting button 903 after the character string of a password is input (YES in step S707), the computer 101 sets the character string of the password to the setting profile and transmits the setting profile to the first printer 102. The transmission of the setting profile is done using the first connection I/F. The first printer 102 performs setting of the second connection I/F using the setting profile, and is connected to the AP selected by the user. Note that if the setting profile of the AP selected by the user operation is held in advance, the computer 101 may omit the processes of steps S706 and S707 and transmit the setting profile to the first printer 102.

According to the processing as shown in FIG. 7, since the user can select the AP to be connected to the first printer 102, the first printer 102 can be prevented from being connected to an unintended AP. In addition, when the user is caused to input the setting profile as in step S706, the second connection I/F of the first printer 102 can appropriately be set even in an environment in which, for example, the setting profile of the AP is not saved in the computer 101. This allows the first printer 102 to establish connection to an appropriate AP and communicate with the management server apparatus 106, and thus perform communication for the target service in step S501.

Note that according to processing as shown in FIG. 7, APs to be connected to the first printer 102 are listed, and selection by the user is accepted. However, connection destinations to be listed are not limited to APs. That is, not only wireless LANs but also pieces of information of networks to which the first printer 102 can be connected may be listed, and the user may be allowed to select, for example, a connection destination by wired connection or a connection destination by another wireless communication standard.

If the first printer 102 becomes communicable with the management server apparatus 106 in the above-described way, registration processing for the target service in step S501 may further be executed. The registration processing will be described with reference to FIG. 10. This processing is started when the computer 101 executes a program for registration processing, and implemented by cooperation of the computer 101 and the first printer 102.

First, the computer 101 requests, using the first connection I/F, the first printer 102 to issue a printer ID (identification information in the service) (step S1001). Note that at this time, the computer 101 transmits the URL (Uniform Resource Locator) of the management server apparatus 106 included in the printer ID issuance request signal. Based on the URL included in the printer ID issuance request, the first printer 102 instructs, using the second connection I/F, the management server apparatus 106 to issue a printer ID and obtains the printer ID (step S1002). The management server apparatus 106 issues a printer ID in response to the printer ID issuance instruction of the first printer 102, and transmits the printer ID to the first printer 102. In addition, the management server apparatus 106 saves the issued printer ID, the issuance date/time, and a status representing that the printer ID is "unregistered" in a printer ID management database in a storage device (not shown). Note that if the printer ID cannot be issued because of server maintenance or the like, the management server apparatus 106 can transmit, to the first printer 102, information representing that issuance of a printer ID is impossible (and the reason for that as needed).

If a printer ID cannot be obtained from the management server apparatus 106 (NO in step S1003), the first printer 102 ends the processing without completing the registration processing. On the other hand, if a printer ID can be obtained from the management server apparatus 106 (YES in step S1003), the first printer 102 saves the printer ID in the RAM 305 (step S1004) and transmits the printer ID to the computer 101 (step S1005). Then, the computer 101 transmits, to the management server apparatus 106, a signal including information concerning the printer ID obtained from the first printer 102 and the printer name of the first printer 102 (step S1006). The management server apparatus 106 creates a registration page configured to register the printer of the printer ID using, for example, a registration page creation program, and transmits the URL of the page to the computer 101 (step S1007). The computer 101 activates a web browser by designating the URL received from the management server apparatus 106, and opens the registration page generated by the management server apparatus 106 (step S1008). Then, the computer 101 accepts a user operation on the registration page, thereby inputting user information such as a user name and a mail address to the management server apparatus 106 (step S1009). According to the acceptance of the user operation, the management server apparatus 106 activates the printer ID (step S1010). The registration processing is thus completed. After that, the first printer 102 transmits the information of the state of the self-apparatus such as the ink cartridge use amount and the cartridge exchange count to the management server apparatus 106 using the second connection I/F at a predetermined timing.

Note that the registration processing may be performed by various methods, and, for example, only a mail address is temporarily registered as user information in step S1009, and proper registration is performed using the URL of proper registration sent to the temporarily registered mail address. In the above-described example, registration of the printer has been explained. However, registration to a plurality of services or registration to a service selected by the user may be possible. At this time, a plurality of management server apparatuses 106 may be prepared on a function basis.

Figure 10:
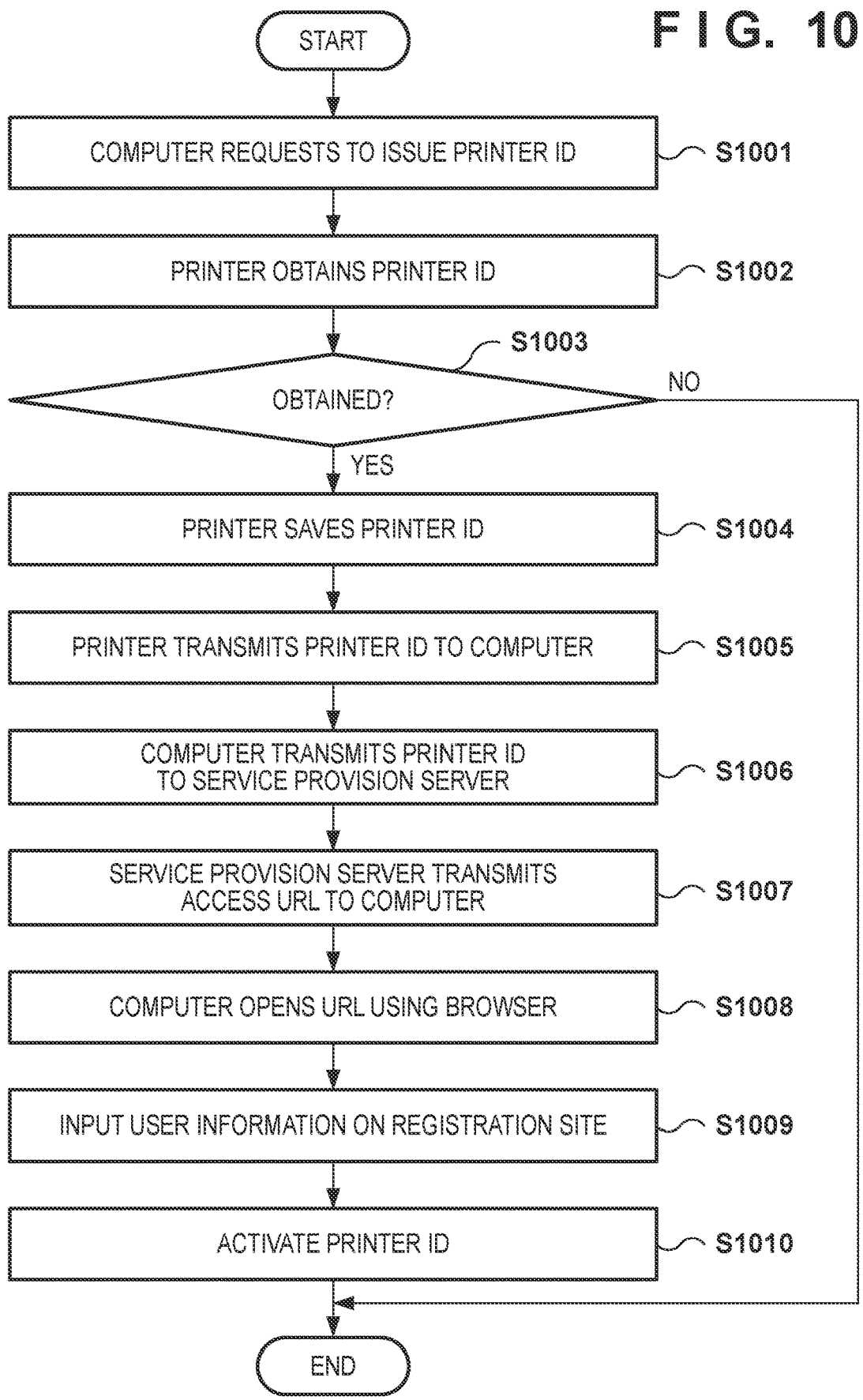
FIG. 10 is a flowchart showing an example of the procedure of registration processing in the management server.
Figure 11:
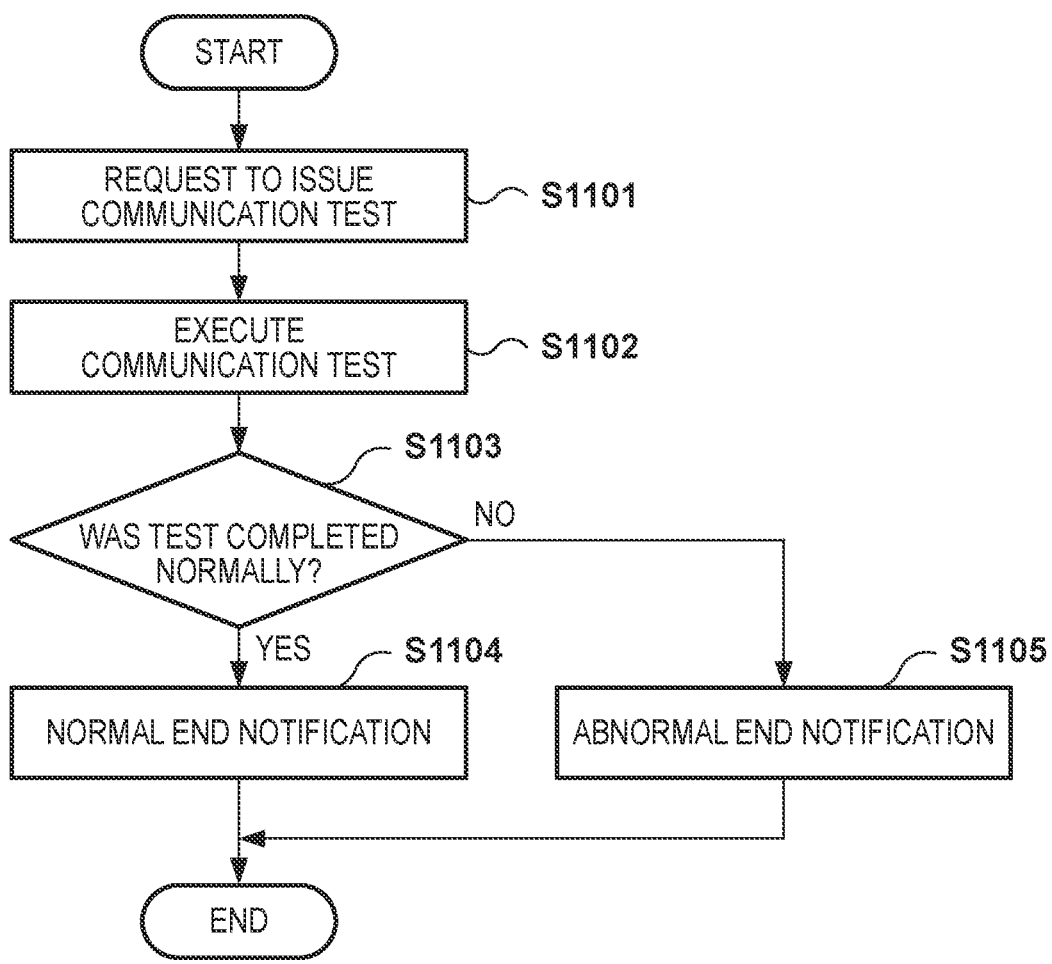
FIG. 11 is a flowchart showing an example of the procedure of connection communication test processing.

Note that after completion of the processing shown in FIG. 10, a connection communication test concerning the usability of the registered service may be performed. An example of the procedure of the connection communication test processing will be described with reference to FIG. 11. This processing is executed when, for example, the user performs an operation of instructing the connection communication test in the program for registration processing, which is operating in the computer 101. Alternatively, this processing may be performed, for example, after completion of the setting of the second connection I/F of the first printer 102 and before execution of the registration processing.

In this processing, first, the computer 101 transmits a connection communication test issuance request to the first printer 102 using the first connection I/F (step S1101). The first printer 102 executes, using the second connection I/F, a communication test with the management server apparatus 106 whose registration is completed (step S1102). Upon determining that the communication test is normally completed (YES in step S1103), the first printer 102 transmits a test normal end notification to the computer 101 (step S1104). Upon receiving the normal end notification, the computer 101 displays a message representing that the test is normally completed on the screen, and ends the processing. On the other hand, upon determining that the communication test is not normally completed (NO in step S1103), the first printer 102 transmits a test abnormal end notification to the computer 101 (step S1105). Upon receiving the test abnormal end notification, the computer 101 displays a message representing that the test is not normally completed on the screen, and ends the processing.

By conducting such a connection communication test, the user can recognize whether the first printer 102 can communicate with the management server apparatus 106. Hence, for example, if the test is not normally completed, the user can executes, on the computer 101, an operation of executing the setting of the second connection I/F of the first printer 102 again. When the setting of the second connection I/F is executed again, the first printer 102 can communicate with the management server apparatus 106.

Note that information included in a signal transmitted/received in each of the above-described processes may be transmitted using a character string, a sequence, or the like representing the information itself, or may be transmitted using another character string capable of uniquely specifying the character string, the sequence, or the like. For example, the output of a hash function that receives the information of the transmission target as the input may be transmitted/received, or information such as an address of a database that stores the information of the transmission target may be transmitted/received. That is, in information transmission/reception, the information itself need not be transmitted/received, and transmitting/receiving information of another arbitrary format capable of obtaining the information suffices.

In the above-described embodiment, an example in which the computer 101 executes the setting of the second connection I/F of the first printer 102 has been described. However, the first printer 102 may execute the above-described processing of the computer 101. That is, the first printer 102 determines whether, for example, the self-apparatus is a target of communication to be performed for a predetermined service. If the self-apparatus is a target of communication to be performed for a predetermined service, the first printer 102 executes setting of a communication interface to enable communication with another apparatus (management server apparatus 106) for the predetermined service. At this time, the first printer 102 can confirm whether a first communication interface for communication with a first another apparatus such as the computer 101 matches a second communication interface for communication with a second another apparatus that communicates for the predetermined service. If the communication interfaces do not match, the first printer 102 sets the second communication interface such that communication with the second another apparatus becomes possible. In this way, the first printer 102 may perform the setting of the second communication interface of the self-apparatus without depending on control by another apparatus. That is, the control apparatus explained as the function of the computer 101 in the above-described embodiment may be provided in the computer 101 or may be provided in the first printer 102.

Similarly, not the computer 101 but the first printer 102 may execute processing for activating the printer ID (identification information) via, for example, a screen, an operation button, and the like provided in the self-apparatus. That is, the computer 101 need not be involved in the processing for activating the printer ID. Additionally, the communication test may be executed independently by the first printer 102 in accordance with, for example, an instruction of the user, and the communication test issuance request may not be issued by the computer 101. Furthermore, a notification to be user may be made by displaying the normal end notification or the abnormal end notification on the display screen or the like of the first printer 102, and the notifications may not be transmitted to the computer 101.

In the above-described embodiment, the description has been made using an example in which the first printer 102 transmits the ink cartridge use amount or the cartridge exchange count to the management server apparatus 106. However, another information may be transmitted. For example, the number of errors that have occurred in the first printer 102, the number of printed pages, or the like may be transmitted.

In the above-described embodiment, the description has been made using a case in which the computer 101 and the first printer 102 are directly connected without the intervention of the router 104. However, the connection partner of the computer 101 need not be a printer. For example, an audio device such as a TV or a speaker, or a digital camera may be the connection partner of the computer 101. In any case, when the connection partner executes the same processing as the first printer 102 described above, the first printer 102 can be connected to the network without the intervention of the computer 101.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-194455, filed on Oct. 15, 2018, which is hereby incorporated by reference herein in its entirety.

What is claimed is:

1. An information processing apparatus capable of communicating with a service providing apparatus, the information processing apparatus comprising:
   at least one processor; and
   at least one memory coupled to the at least one processor, wherein the at least one memory stores a computer-readable instruction that causes, when executed by the at least one processor, the information processing apparatus to:
      communicate with a communication apparatus via an interface; and
      perform control to, on the basis that the communication apparatus is capable of performing a predetermined service function that is provided by the service providing apparatus and that the communication apparatus is not ready to communicate with the service providing apparatus, perform a setting process using the interface such that the communication apparatus becomes ready to communicate with the service providing apparatus, and not to perform the setting process on the basis that the communication apparatus is capable of performing the predetermined service function relating to the service providing apparatus and that the communication apparatus is ready to communicate with the service providing apparatus.

2. The information processing apparatus according to claim 1, wherein in a case where the information processing apparatus communicates with the service providing apparatus via a network and where the information processing apparatus communicates with the communication apparatus using the network, the setting process is not performed.

3. The information processing apparatus according to claim 1, wherein in a case where a connection destination group to which the communication apparatus can be connected includes a second connection destination to which the information processing apparatus is connected, the setting process is performed such that the communication apparatus is connected to the second connection destination.

4. The information processing apparatus according to claim 1, wherein in a case where a connection destination group to which the communication apparatus can be connected includes a third connection destination whose information concerning a setting is saved in the information processing apparatus, the setting process is performed such that the communication apparatus is connected to the third connection destination.

5. The information processing apparatus according to claim 1, wherein the computer-readable instruction further causes, when executed by the at least one processor, the information processing apparatus to:

present, to a user, a list of connection destinations to which the communication apparatus can be connected; and accept selection of a connection destination by the user, and wherein the setting process is performed such that the communication apparatus is connected to the selected connection destination.

6. The information processing apparatus according to claim 1, wherein the interface is an interface configured to communicate using a universal serial bus (USB).

7. The information processing apparatus according to claim 1, wherein the computer-readable instruction further causes, when executed by the at least one processor, the information processing apparatus to obtain identification information of the communication apparatus in the predetermined service function and transmit the identification information to the service providing apparatus.

8. The information processing apparatus according to claim 1, wherein the communication apparatus is a printer.

9. The information processing apparatus according to claim 8, wherein the predetermined service function is a service function that gives a privilege to a user of the printer by providing information representing a state of the printer to the other apparatus service providing apparatus.

10. The information processing apparatus according to claim 9, wherein the information representing the state of the printer includes at least one of an ink cartridge use amount and a cartridge exchange count.

11. A control method executed by an information processing apparatus, comprising:

communicating with a communication apparatus via an interface; and performing control to, on the basis that the communication apparatus is capable of performing a predetermined service function that is provided by a service providing apparatus and that the communication apparatus is not ready to communicate with the service providing apparatus, perform a setting process using the interface such that the communication apparatus becomes ready to communicate with the service providing apparatus, and not to perform the setting process on the basis that the communication apparatus is capable of performing a predetermined service function relating to the service providing apparatus and that the communication apparatus is ready to communicate with the service providing apparatus.

12. The method according to claim 11, wherein in a case where the information processing apparatus communicates with the service providing apparatus via a network and where the information processing apparatus communicates with the communication apparatus using the network, the setting process is not performed.

13. The method according to claim 11, wherein in a case where a connection destination group to which the communication apparatus can be connected includes a second connection destination to which the information processing apparatus is connected, the setting process is performed such that the communication apparatus is connected to the second connection destination.

14. The method according to claim 11, wherein in a case where a connection destination group to which the communication apparatus can be connected includes a third connection destination whose information concerning a setting is saved in the information processing apparatus, the setting process is performed such that the communication apparatus is connected to the third connection destination.

15. The method according to claim 11, further comprising:

presenting, to a user, a list of connection destinations to which the communication apparatus can be connected; and accepting selection of a connection destination by the user, wherein the setting process is performed such that the communication apparatus is connected to the selected connection destination.

16. The method according to claim 11, wherein the interface is an interface configured to communicate using a universal serial bus (USB).

17. The method according to claim 11, further comprising obtaining identification information of the communication apparatus in the predetermined service function and transmitting the identification information to the service providing apparatus.

18. The method according to claim 11, wherein the communication apparatus is a printer.

19. The method according to claim 18, wherein the predetermined service function is a function that gives a privilege to a user of the printer by providing information representing a state of the printer to the service providing apparatus.

20. The method according to claim 19, wherein the information representing the state of the printer includes at least one of an ink cartridge use amount and a cartridge exchange count.

21. A non-transitory computer-readable storage medium that stores a program that causes a control an information processing apparatus to:
- communicate with a communication apparatus via an interface; and
- perform control to, on the basis that the communication apparatus is capable of performing a predetermined service function that is provided by a service providing apparatus and that the communication apparatus is not ready to communicate with the service providing apparatus, perform a setting process using the interface such that the communication apparatus becomes ready to communicate with the service providing apparatus, and not to perform the setting process on the basis that the communication apparatus is capable of performing a predetermined service function relating to the service providing apparatus and that the communication apparatus is ready to communicate with the service providing apparatus.

* * * * *